(12) United States Patent
Bacher

(10) Patent No.: US 9,102,991 B2
(45) Date of Patent: Aug. 11, 2015

(54) ADJUSTABLE DIE FIXTURE AND SUPPORT SYSTEM FOR HEATING TREATING PROCESS

(71) Applicant: John R. Bacher, Cortland, OH (US)

(72) Inventor: John R. Bacher, Cortland, OH (US)

(73) Assignee: Primetals Technologies USA LLC, Warren, OH (US)

( * ) Notice: Subject to any disclaimer, the term of this patent is extended or adjusted under 35 U.S.C. 154(b) by 103 days.

(21) Appl. No.: 13/946,424

(22) Filed: Jul. 19, 2013

(65) Prior Publication Data

US 2015/0021838 A1    Jan. 22, 2015

(51) Int. Cl.
*C21D 9/00*    (2006.01)

(52) U.S. Cl.
CPC .................. *C21D 9/0025* (2013.01)

(58) Field of Classification Search
CPC ......... C21D 1/62; C21D 1/673; C21D 9/0025
USPC ........................................................ 266/259
See application file for complete search history.

(56) References Cited

U.S. PATENT DOCUMENTS

| 5,518,557 | A | * | 5/1996 | Jones et al. | 148/511 |
| 6,048,418 | A | * | 4/2000 | Canner | 148/589 |
| 8,034,285 | B2 | * | 10/2011 | Canner | 266/259 |

FOREIGN PATENT DOCUMENTS

EP    1191111 A1 *  3/2002

* cited by examiner

*Primary Examiner* — Scott Kastler
(74) *Attorney, Agent, or Firm* — Harpman & Harpman

(57) ABSTRACT

An integrated adjustable die fixture to be used to hold and stabilize large parts from dimensional fluctuation during the heat treating quenching process. The die fixture provides for a pair of interlocking dies each with a plurality of radially positioned interchangeable and configurable part engagement blades to conform and hold the part during quenching. A die fixture support and transport lifting frame selectively engages integrated die fixture and part for transport, positioning and select access to quenching furnace.

8 Claims, 6 Drawing Sheets

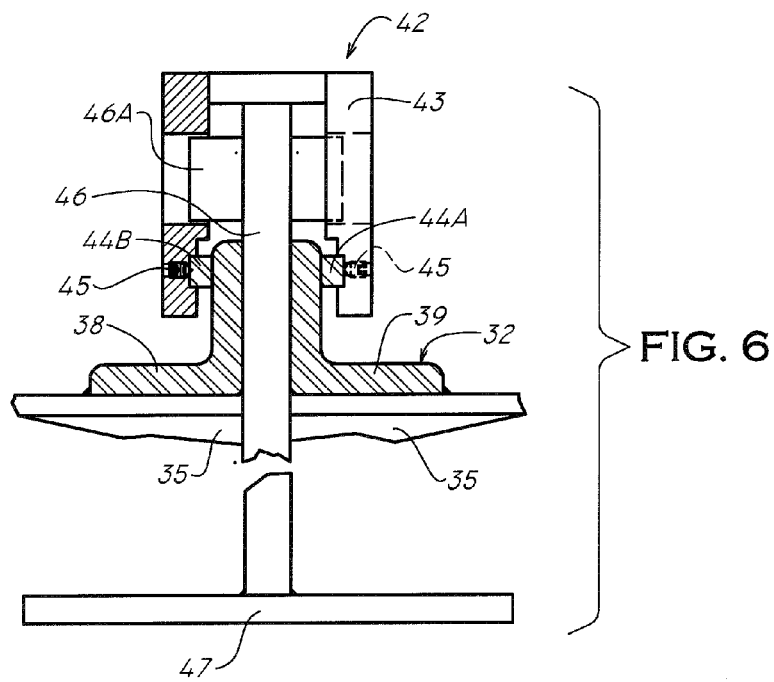
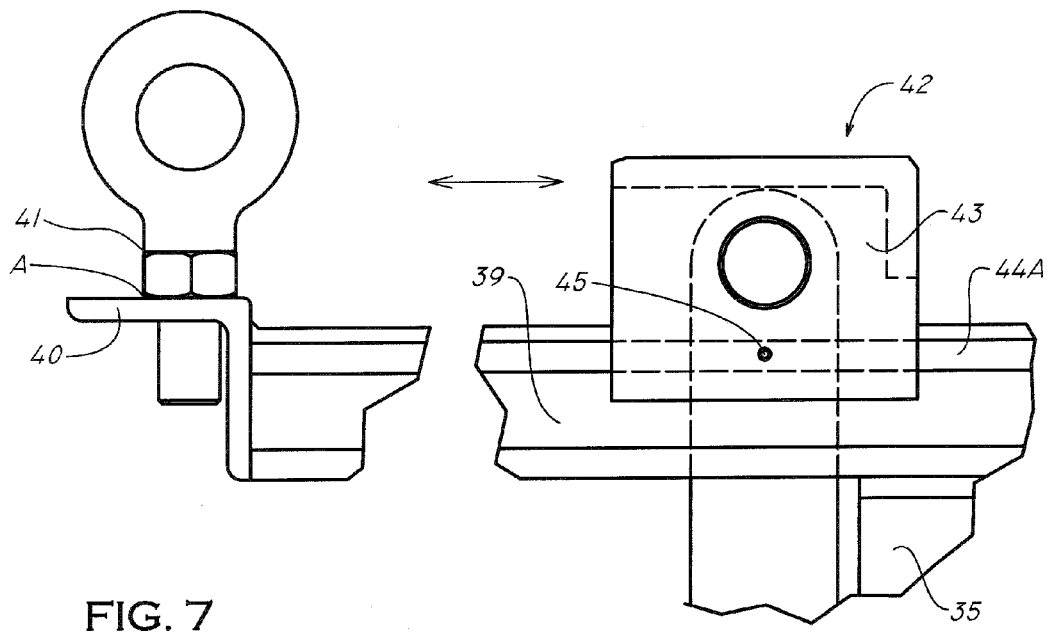
FIG. 6
FIG. 7

ADJUSTABLE DIE FIXTURE AND SUPPORT SYSTEM FOR HEATING TREATING PROCESS

BACKGROUND OF THE INVENTION

1. Technical Field

This invention relates to heat treating of large parts such as steel rings and bearing races that require the parts to be heated and then quenched to impart case hardening. Such case hardening typically requires a two step process, gas carburizing and austenitizing. For gas carburizing, a steel part is heated to an elevated uniform temperature in a carbon-rich gas atmosphere. This allows the carbon in the atmosphere to diffuse into a layer at the surface of the part.

During austenitizing (heat treating), a steel part is heated within the austenitizing range 1,455-1,680°, Fahrenheit, in a gas-fired integrated quenching furnace. The heated part is heated to a uniform temperature and then rapidly quenched in a medium, typically oil. This heating and rapid cooling imparts dimensional variations in such large parts and they will become out-of-round and out-of-flat, requiring the need initially to have extra stock in the part to be machined off and extra case depths to ensure sufficient case after machining.

2. Description of Prior Art

Prior art quenching methods and apparatus can be seen generally in U.S. Pat. Nos. 6,048,418; 8,034,258 B2; and EP 1,191,111 A1.

U.S. Pat. No. 6,048,418 is directed to a ring-forming apparatus and heat treating process wherein flat ring parts are heated, then placed in a die and submerged in a quenching bath to form the ring into its final shape while therewithin.

U.S. Pat. No. 8,034,285 B2 illustrates quenching methods and devices for quenching a steel ring which includes a corresponding set of quenching dies, a die handling tool, and related methods to lift the corresponding set of quenching dies and die handling apparatus to load and unload the dies into a quenching press.

Finally, Patent EP 1,191,111 A1 discloses a method and apparatus for press tempering wherein a heated part is placed into a pressing device and then cooled with a coolant.

SUMMARY OF THE INVENTION

A two-part die fixture system wherein each die has interchangeable die blades configured to conform to large work pieces to be positioned thereon and held therebetween when locked together. A lifting fixture of the system provides for selective engagement of the part independently and together for transport simultaneously to and from a quenching furnace, as well as part engagement and placement and removal from the die fixture.

DESCRIPTION OF THE DRAWINGS

FIG. 6 is an enlarged partial sectional view of the part lifting arm adjustment support fitting on the lifting fixture.

FIG. 7 is an enlarged partial side elevational view of the lifting arm adjustment of FIG. 6 of the drawings.

DETAILED DESCRIPTION OF THE INVENTION

Figure 1:
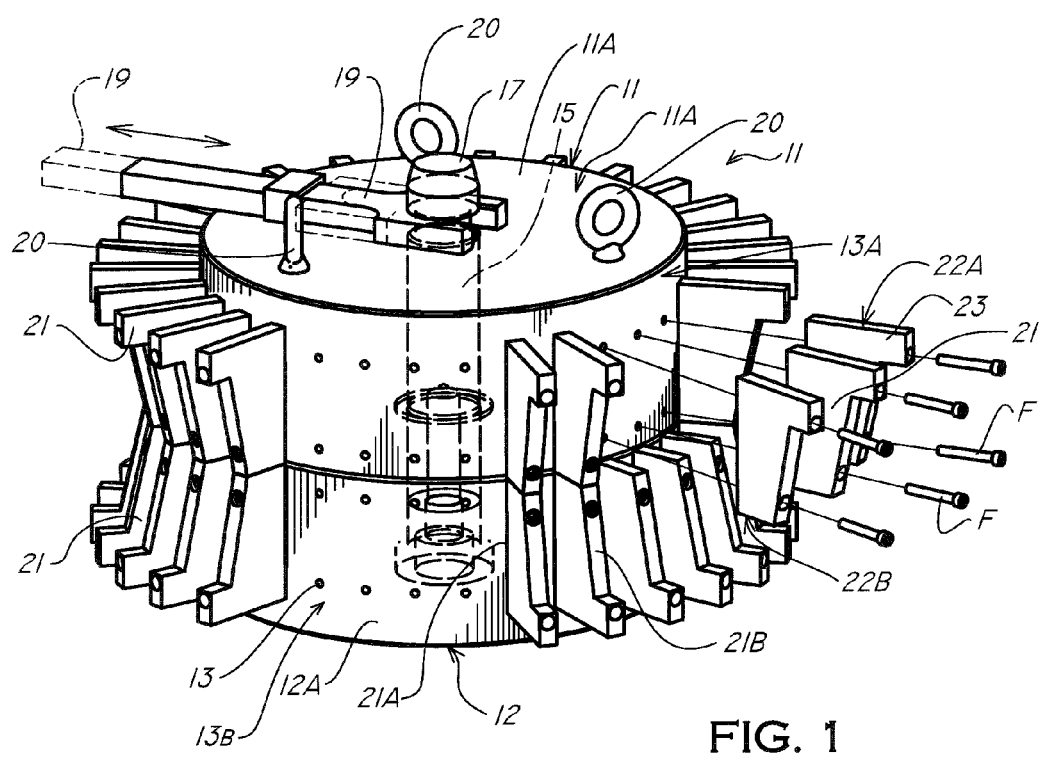
FIG. 1 is a perspective exploded view of the two-part die fixture locked together illustrating removable die blades selectively positioned thereon.
Figure 2:
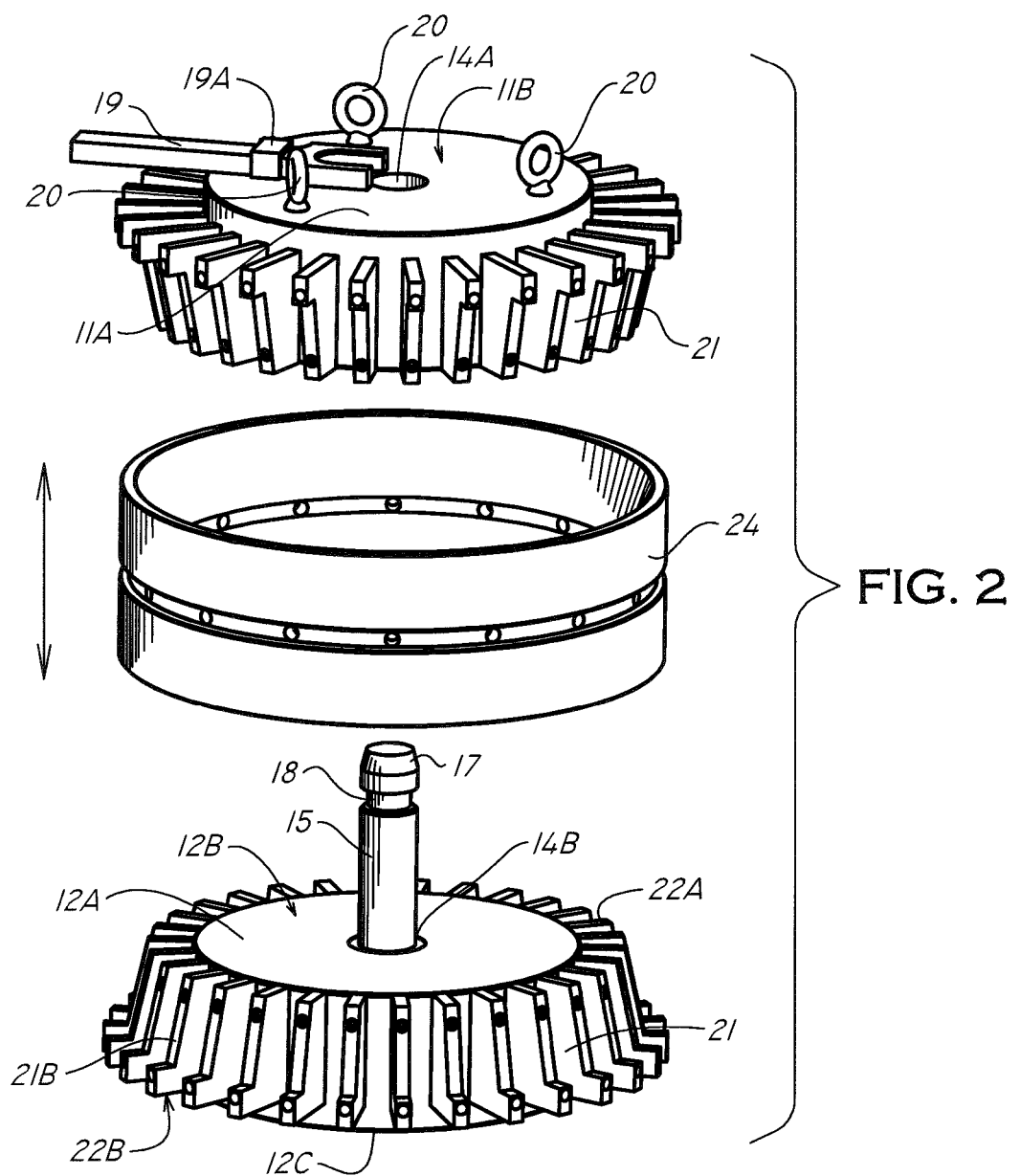
FIG. 2 is an exploded perspective view of the die fixture and part to be placed and held thereon and therebetween.

Referring now to FIGS. 1 and 2 of the drawings, a die fixture assembly 10 of the invention can be seen having selectively engaged upper adjustable die 11 and a lower adjustable die 12. Each of the adjustable dies 11 and 12 have an annular fixture base 11A and 12A of machined steel. Each of the annular fixture bases 11A and 12A have a plurality of threaded bores 13 positioned thereabout in spaced parallel to one another within the respective annular sidewalls 13A and 13B, best seen in FIG. 1 of the drawings. The fixture bases 11A and 12A have respective top surfaces 11B and 12B and bottom surfaces 11C and 12C in spaced parallel relation to one another.

A pair of center centralized bores at 14A and 14B extend respectively through the corresponding fixture bases 11A and 12A for receivable engagement of an enlarged locking pin 15 that extends from the fixture base 12A, beyond its top surface 12B for registration through the fixture base 11A.

The locking pin 15 has an extending tapered end portion 17 with an area of reduced annular dimension 18 there below. The locking pin 15 is aligned for registration with and through the bore 14A in the fixture base 11A and for selective engagement by a key lock yoke 19 which is slidably disposed on its top surface 11B through a guide bracket 19A shown in unlocked position in FIG. 2 of the drawings, and a locked engaged position in FIG. 1 of the drawings.

Multiple die fixture lifting rings 20 are threadably secured in and extend from the top surface 11B spaced annularly thereabout as will be discussed in greater detail hereinafter.

A key element of the adjustable die fixture assembly are a plurality of interchangeable customizable die blades 21, each having right angular edge base engagement 21A and, in this example, an offset part engagement angular edge 21B with spaced oppositely disposed respective parallel end edge surfaces 22A and 22B extending therefrom.

Figure 4:
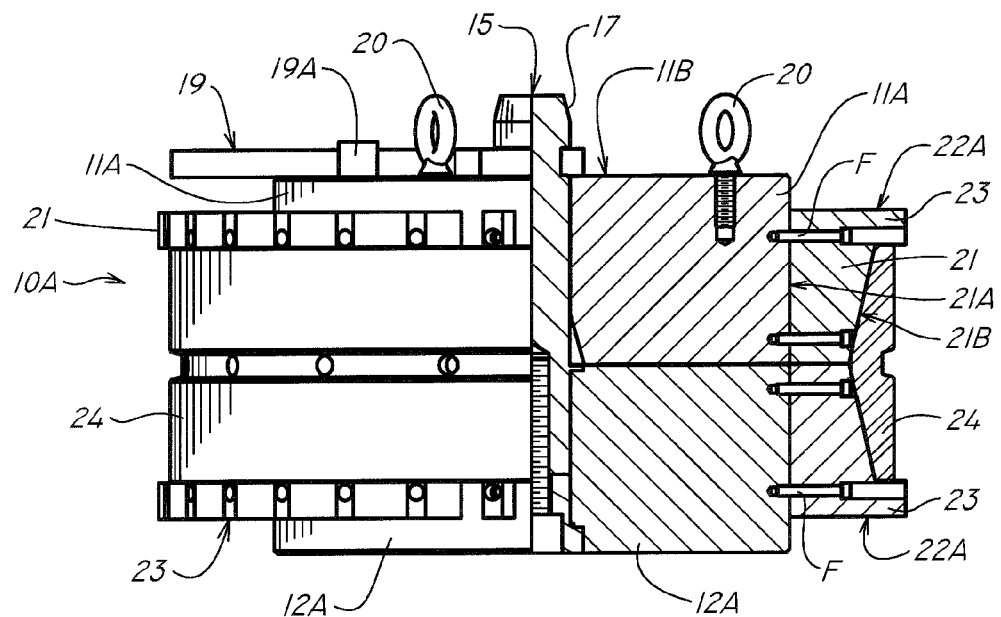
FIG. 4 is a composite partial cross-section view of the two-part die fixture with a part positioned thereon.

Each of the interchangeable blades 21 are secured sequentially to the respective fixture bases respective annular sidewalls 13A and 13B by a pair of socket-head cap fasteners F that extend through corresponding aligned openings in their respective angular edge 21B and right angled extending edge portion 23, and threadably engaged into the hereinbefore described threaded bores 13 as best seen in FIG. 4 of the drawings. This arrangement of individual mounted die blades 21 provide for adaptable interchangeable effective die surfaces which will accommodate therefore a wide variety of different configured parts 24, illustrated in this example in FIG. 2 of the drawings.

Figure 3:
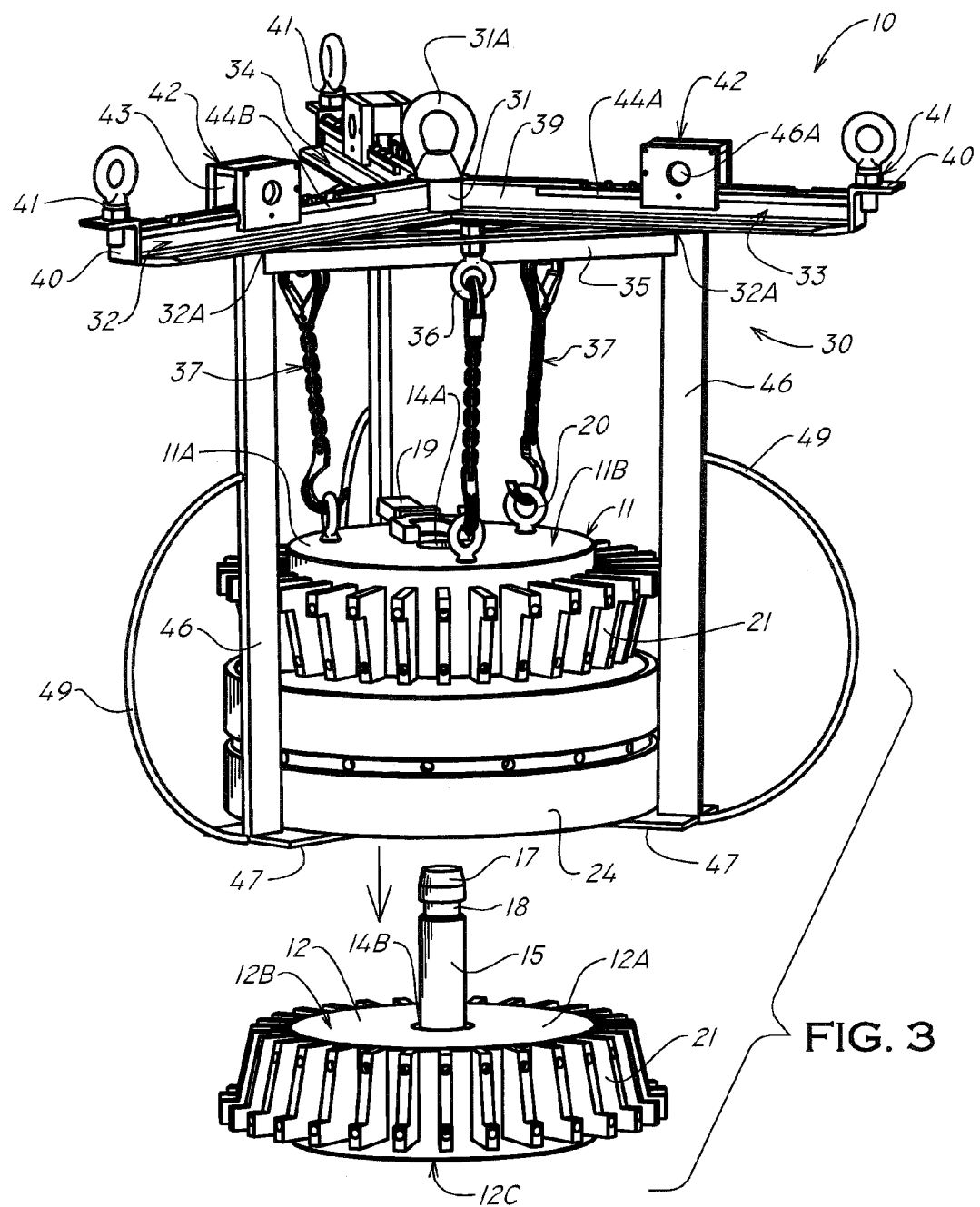
FIG. 3 is an exploded perspective view of the die fixture and part engaged by the lifting fixture for placement and removal together.

Referring to FIG. 3 of the drawings, a lifting fixture 30 can be seen engaging by the lifting rings 20 of the upper fixture base 11A with multiple die blades 21 secured thereto.

Figure 5:
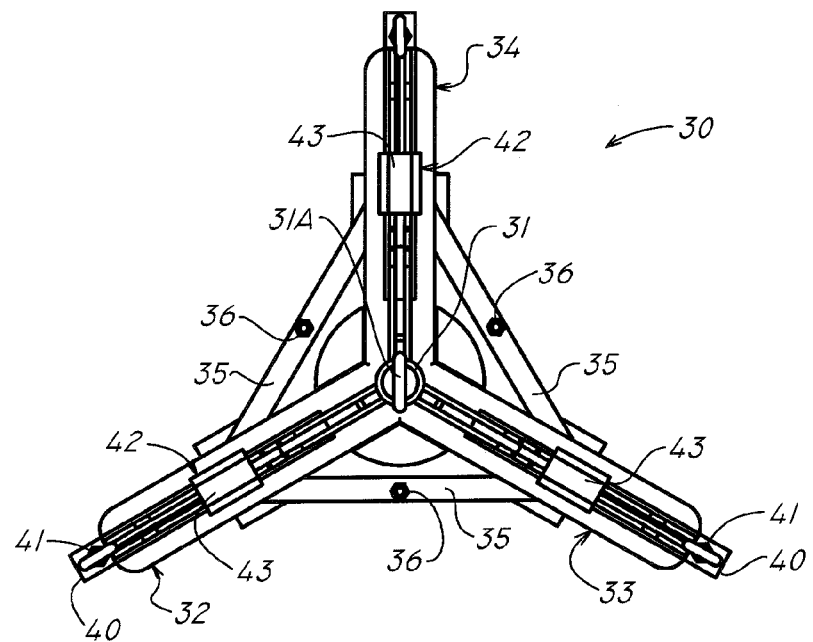
FIG. 5 is a top plan view of the lifting fixture independently of the die fixture.

The lifting fixture 30 of the die fixture assembly 10 has a central hub 31 with an upstanding lifting ring 31A extending therefrom. Multiple longitudinally extending fixture brackets 32, 33, and 34, extend from the central hub 31 in equal space radial relation to one another as best seen in FIG. 5 of the drawings. Interconnecting braces 35 are secured between the respective brackets 32, 33, and 34, preferably by welding to their respective surfaces generally indicated at 32A. Each of the braces 35 are apertured midpoint with an I-bolt assembly 36 extending therethrough which are in corresponding general alignment with the hereinbefore described die fixture lift rings 20, which allow for selective interconnection thereto by multiple chain and hook assemblies 37 as seen in FIG. 3 of the drawings.

The fixture brackets 32, 33 and 34, are preferably formed from pairs of paralleled spaced angle irons 38 and 39, best seen in FIGS. 3 and 6 of the drawings, each of which has an L-shaped end bracket 40 adjoining their respective free ends. The end brackets 40 are apertured at A with an I-bolt fitting 41 secured therethrough. Each of the lifting fixture brackets 32, 33 and 34, has a lifting arm engagement assembly 42 thereon for longitudinal adjustment there along. The arm engagement assembly 42 is formed by an inverted U-shaped apertured support fitting 43 slidably engaged on a pair of oppositely disposed parallel guide tracks 44A and 44B that are secured to and extend outwardly from the vertical portions of the respective angle irons 38 and 39 as seen in FIGS. 3, 6 and 7 of the drawings.

Each of the U-shaped apertured support fittings 43 have a fixation set screw 45 therein that engages respective guide tracks 44A locking the fitting 43 in position thereon. The foregoing arrangement allows for part size adjustment within a specific range as will be well understood by those skilled in the art.

It will be seen that lifting arms 46 are pivotally secured within the apertured engagement support assemblies 42 by a pivot pin 46 extending therethrough in engageable alignment through the respective apertured U-shaped fitting 43. The lifting arms 44 have a material engagement foot plate 47 that extends at right angles from their respective free ends as best seen in FIG. 3 of the drawings. Each of the material plates 47 has a handle rod 49 extending therefrom arcuately up to its respective lift arm 44 which provides user directive material arm engagement and release during use.

In use, the part 24 to be quenched is positioned on the plurality of interchangeable die blades 21 of each of the respective die fixture portions 11 and 12 and secured by sliding engagement of the locking yoke 19 for registration with the locking pin 15 as seen in FIG. 4 of the drawings.

Figure 8:
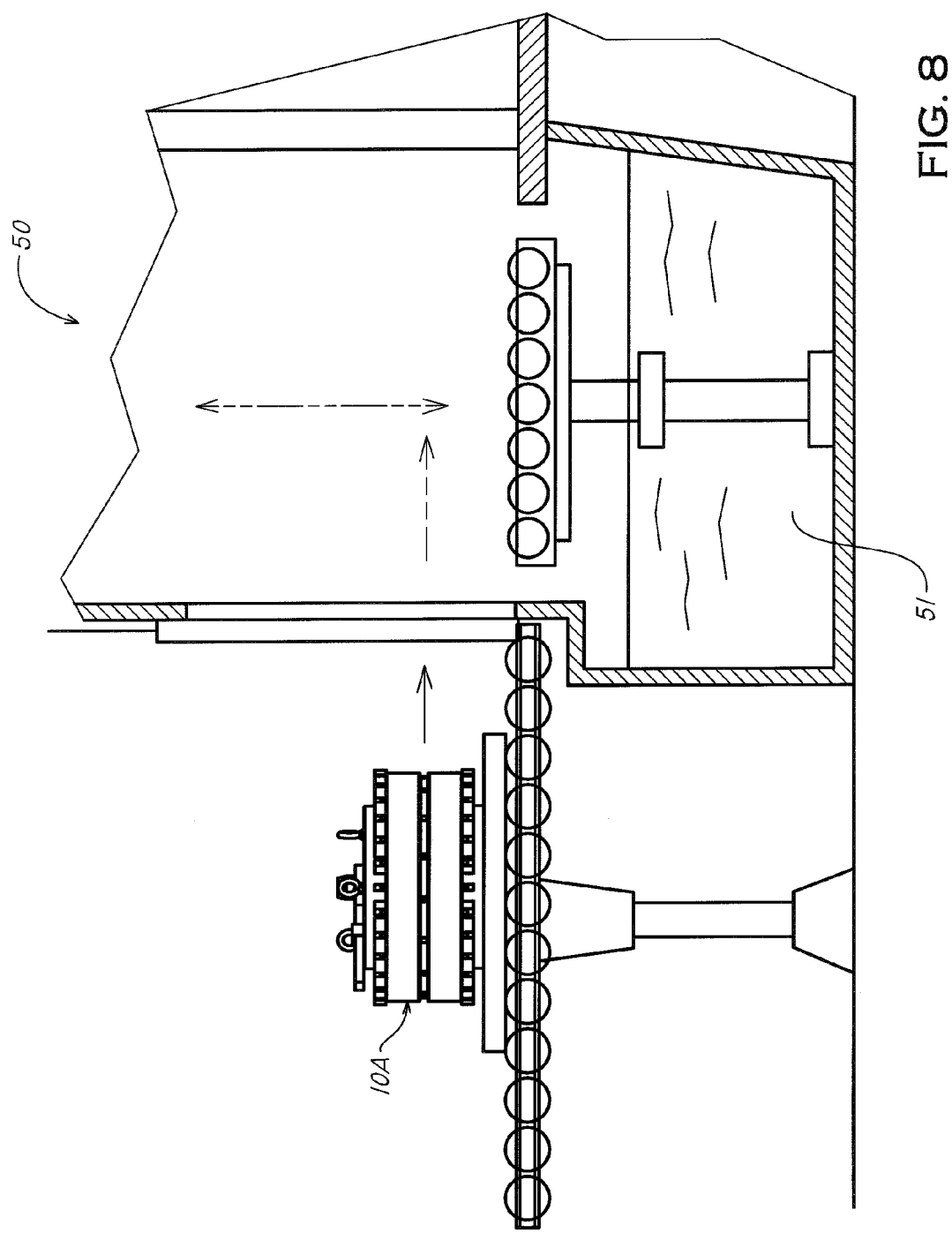
FIG. 8 is a graphic representation of a quenching furnace with a fixture engaged part positioned thereon for illustration purposes.

The locked die assembly 10A and part 24 positioned thereon is lifted by the lifting fixture 30 to an integrated quenching furnace 50 shown graphically for reference in FIG. 8 of the drawings. The locked die assembly 10A is released from lifting fixture 30 and is moved into the quenching furnace 50 and its heat inducing quenching sequence by submerging in hot quenching fluid 51, as required in the heat treating process as understood by those skilled in the art.

It will be evident from the above description that the die fixture assembly 10 of the invention comprising independent die bases 11A and 12A, each with interchangeable die blades 21 are therefore are conformable to specific large parts to be heat treated and the integrated integral lifting fixture 30 allows for carrying the heated part 25 and upper die base 11A simultaneously, maintaining the part's temperature during placement.

The ability to lift both the die and the part aligned with the unique interchangeable configurable die blades 21 assures that minimal part distortion will occur during the quenching process, eliminating the heretofore need for additional machining and thus the implied additional part material normally required due the necessity of the machining to overcome the out-of-flat or out-of-round nature implicit in the quenching process, especially in large parts, as hereinbefore described. It will thus be seen that a new and novel integrated size adjustable die fixture and fixture support and transport lifting assembly has been illustrated and described and will be apparent to those skilled in the art with various changes and modifications may be made thereto without departing from the spirit of the invention.

Therefore I claim:

1. An adjustable die fixture and lifting frame combination for heat treating metal parts comprises,
   a part retaining die fixture assembly and a lifting die fixture and part transport frame assembly registerable with said die fixture assembly,
   said part retaining die fixture assembly comprises, retaining dies,
   a plurality of die blades removably secured to said retaining dies,
   a locking pin extending through multiple aligned retaining dies securing said dies and a part positioned thereon together,
   said lifting fixture and part transport frame assembly comprising,
   a plurality of interconnected releasable extending fixture brackets,
   die engagement braces secured between said brackets,
   adjustable lifting arm engagement assemblies on each of said fixture brackets and part lifting arms pivotally extending from said respective arm engagement assemblies.

2. The adjustable die fixture set forth in claim 1 wherein said die blades have at least one fastener extending therethrough into at least one threaded bore in said retaining die.

3. The adjustable die fixture set forth in claim 1 were in said locking pin further comprises a pin engagement locking yoke, movable from a first unengaged, unlocked position to a pin engaged lock position.

4. The adjustable die fixture set forth in claim 3 wherein said locking yoke is slidably disposed on the surface of one of said die retaining dies.

5. The adjustable die fixture and lifting frame combination set forth in claim 1 wherein said fixture brackets comprise,
   a pair of spaced parallel angle irons, and end fitting secured thereto, and guide tracks on respective angle irons.

6. The adjustable die fixture and lifting frame combination set forth in claim 5 wherein said adjustable lifting arm engagement assemblies comprise,
   an apertured fitting slidably disposed on said tracks, a pivot pin extending through said aperture fitting and said part lifting arm positioned therewithin.

7. The adjustable die fixture set forth in claim 1 wherein said part lifting arms have a right angled inwardly extending material engagement foot plate on their respective oppositely disposed end and a handle rod extending from said foot plate to a point on said lifting arms in space relation thereto.

8. The adjustable die fixture set forth in claim 1 wherein said die engagement braces further comprises, a hook and chain assembly extending between said die engagement braces and multiple die fixture lifting rings on one of said dies.

* * * * *